(No Model.) 3 Sheets—Sheet 1.
E. A. PORTER.
CORN HUSKING AND CRUSHING MACHINE.
No. 360,044. Patented Mar. 29, 1887.
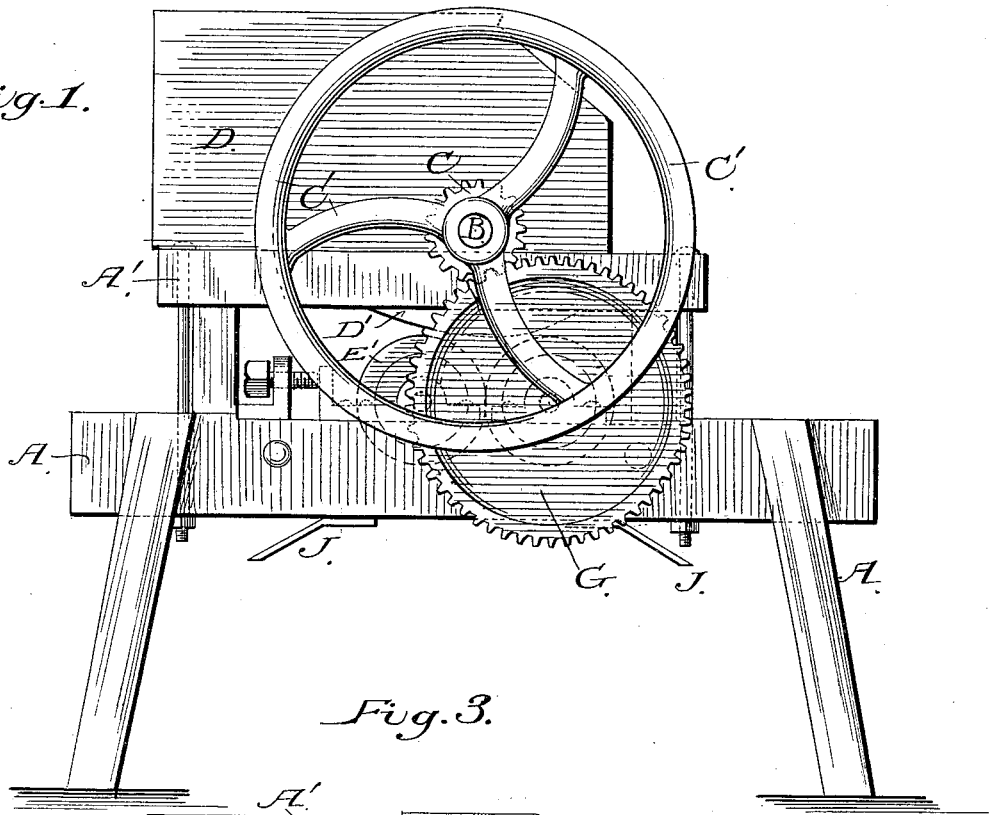

(No Model.) 3 Sheets—Sheet 2.
E. A. PORTER.
CORN HUSKING AND CRUSHING MACHINE.
No. 360,044. Patented Mar. 29, 1887.
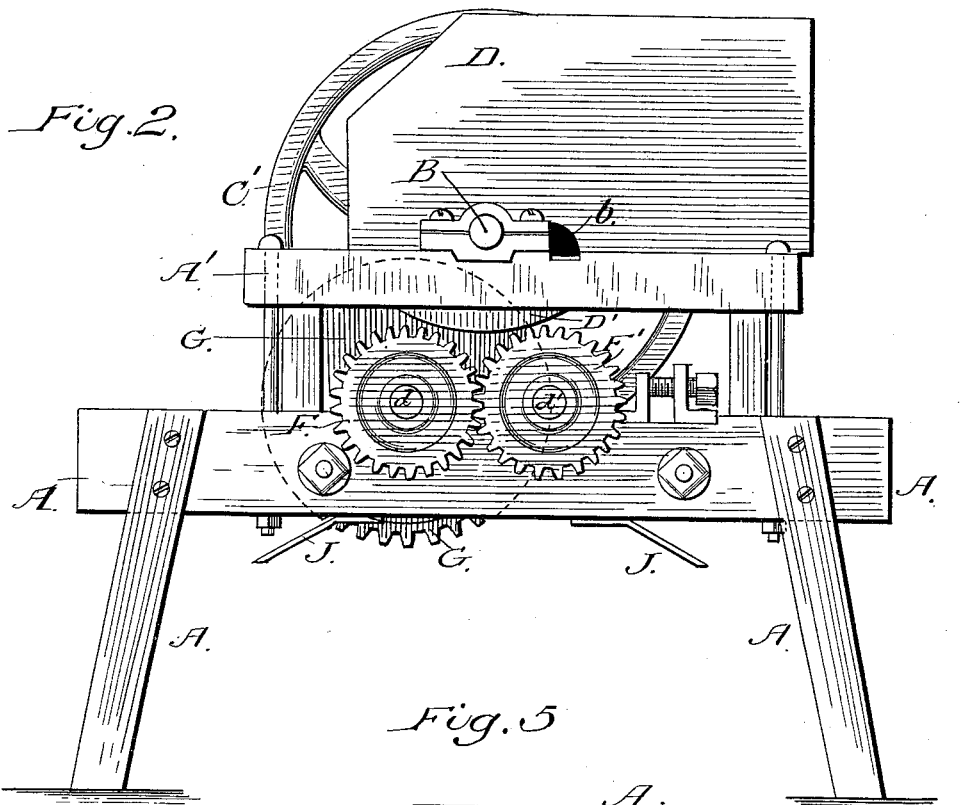
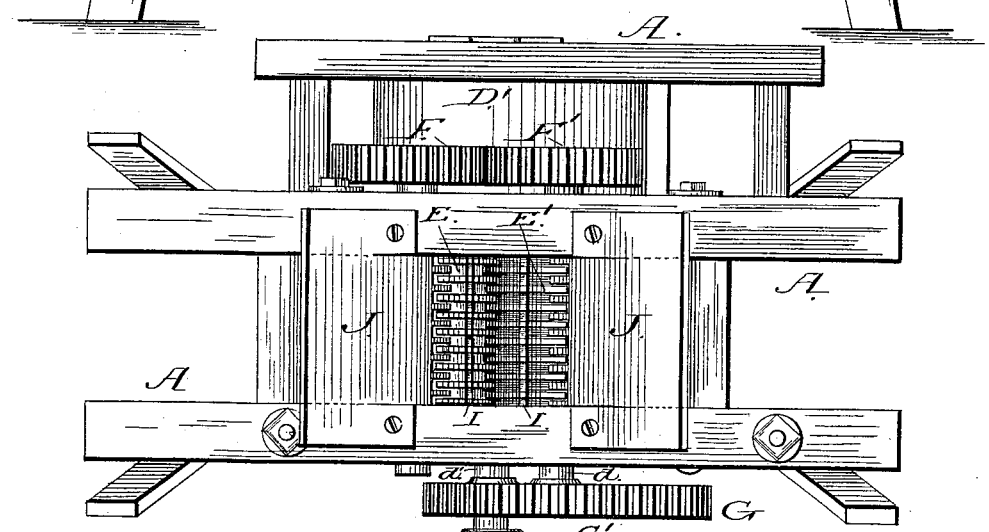

(No Model.) 3 Sheets—Sheet 3.
E. A. PORTER.
CORN HUSKING AND CRUSHING MACHINE.
No. 360,044. Patented Mar. 29, 1887.
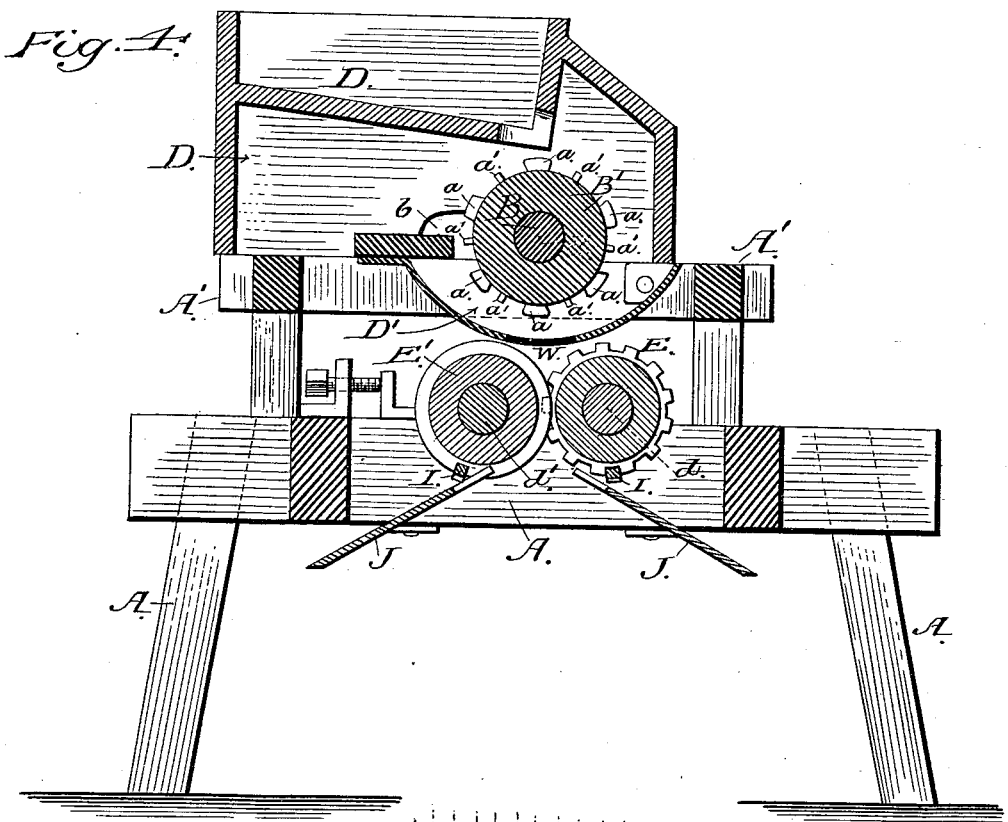
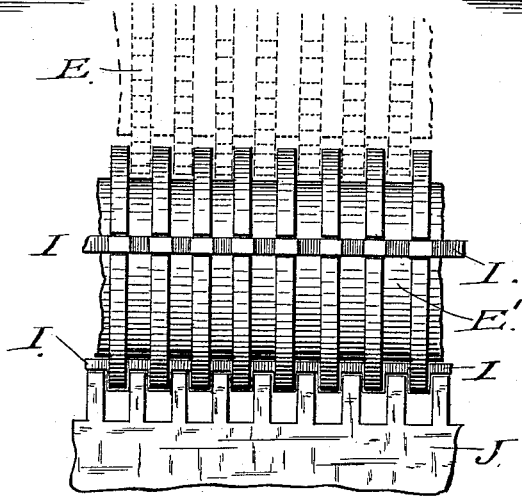
Witnesses
T. Walter Fowler
H. B. Applewhaite
Inventor
Eugene A. Porter
By his Attorneys
A. H. Evans & Co

UNITED STATES PATENT OFFICE.

EUGENE A. PORTER, OF BOWLING GREEN, KENTUCKY.

CORN HUSKING AND CRUSHING MACHINE.

SPECIFICATION forming part of Letters Patent No. 360,044, dated March 29, 1887.

Application filed July 16, 1886. Serial No. 208,220. (No model.)

*To all whom it may concern:*

Be it known that I, EUGENE A. PORTER, a citizen of the United States, residing at Bowling Green, in the county of Warren and State of Kentucky, have invented certain new and useful Improvements in Corn Husking and Crushing Machines; and I do hereby declare the following to be a full, clear, and exact description of the said invention, reference being had to the accompanying drawings, forming a part of this specification, in which—

Figure 1 represents a side elevation of the machine. Fig. 2 is an elevation from the opposite side. Fig. 3 is a plan view with a portion of the hopper broken away. Fig. 4 is a longitudinal sectional view on the line $xx$ of Fig. 3. Fig. 5 is a bottom plan view. Fig. 6 is a detail view of the bar I and its adjuncts.

The object of my present invention is to provide a machine for cutting the husk from the corn, shelling the corn from the cob, and then crushing the grains for feeding stock; and the invention consists in the construction and combination of devices hereinafter described and claimed.

To enable others skilled in the art to make and use my invention, I will proceed to describe the exact manner in which I have carried it out.

In the said drawings, A represents a suitable frame-work for supporting the operating parts of the machine, and also for supporting a supplemental frame, A', on which is journaled the shaft B, having suitable bearings and carrying the drum B', the pinion C, and the bandwheel C'.

On the periphery of the drum B, and for about one-third of its length, I secure short sharp cutting-blades $a$, arranged in quincunx order to split the shucks as the ears of corn pass from the hopper onto the drum through the opening B''.

In addition to the cutting-blades, I secure upon the entire outer surface of the drum a number of projections or teeth, $a'$, arranged in quincunx order for stripping the grains of corn from the cob.

It will be observed that the ears of corn pass from the hopper through the opening B'', so as to fall only on that end of the drum provided with the blades, and after having the shucks split by the cutting-blades $a$ are fed by the quincunx arrangement of said knives onto the teeth $a'$, which strip off the grain, when the cob, which has been carried to the side of the frame opposite to the opening B'' by the action of said knives and teeth, is ejected through the opening $b$ in the side of the hopper D.

As the grain and husks are removed from the cob they are caught in a second hopper, D', situated immediately beneath the drum B', and from this hopper they pass through an opening, W, to the crushing-rolls E E', carried on the shafts $d$ $d'$, and having suitable bearings in the frame A. On these shafts are also the intermeshing spur-wheels F F', and on the opposite end of the shaft $d$ is secured the large cog-wheel G, intermeshing with and driven by the pinion C on the shaft B. The spur-wheel F on the shaft $d$ drives the shaft $d'$ through the other spur-wheel, F'.

The crushing-rolls E E' are ribbed and grooved transversely, and so placed that the ribs of the rolls will pass into and register with the grooves, as shown in Fig. 5, and the ribs of each roller will nearly touch the bottoms of the grooves in the other. The ribs on the roller E are also fluted in lines parallel with the axis of the roll; but these lines are not so deep as to reach to the bottoms of the ribs, but deep enough to divide up the ribs of said roller E into lines of teeth, which pass through the grooves in roller E' and crush the grain without grinding it.

It is evident that the grooves in rollers would soon become choked unless proper and efficient means were provided to keep them clear of the crushed grain. To this end I place longitudinally across each roll a steel bar, I, let in flush with the ribs, and provided with openings for the passage of the teeth of cleaners J J. (See Figs. 4 and 6.) The teeth of these cleaners pass loosely into the grooves of the rolls and serve to remove the crushed corn and prevent the grooves from becoming choked; but as the teeth have to move loosely through these grooves they may in turn get choked with bits of shuck. To overcome this possible difficulty is the purpose of the steel bars I, through the openings of which the teeth pass close enough to have a cutting effect and shear off any matter which may impede the proper action of the teeth.

Having thus described my invention, what

I claim as new, and desire to secure by Letters Patent, is—

1. The frame A' and the hopper D, having the feed-opening B'' and the discharge-opening $b$, in combination with the drum B', having the cutting-blades $a$ and teeth $d$, and an underlying hopper, D', substantially as herein described.

2. The rolls E E', ribbed and grooved as described, and provided with the bars I, in combination with the cleaners J, substantially as herein described.

3. An improved corn husking and crushing machine, comprising a hopper having a feed-opening at one side and a discharge-opening at the opposite side, a roll having cutting-knives and teeth, the underlying ribbed and grooved rolls having the bars I and the cleaners J, substantially as herein described.

EUGENE A. PORTER.

Witnesses:
T. WALTER FOWLER,
DANIEL CLARK.